(12) United States Patent
Shiau et al.

(10) Patent No.: US 6,631,215 B1
(45) Date of Patent: Oct. 7, 2003

(54) METHOD AND APPARATUS FOR IMPLEMENTING INTEGRATED CAVITY EFFECT CORRECTION IN SCANNERS

(75) Inventors: Jeng-nan Shiau, Webster, NY (US); Raymond J. Clark, Webster, NY (US); Stuart A. Schweid, Pittsford, NY (US); Terri A. Clingerman, Palmyra, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/448,009

(22) Filed: Nov. 23, 1999

(51) Int. Cl.$^7$ .................................................. G06K 9/40
(52) U.S. Cl. ...................... 382/260; 358/3.27; 382/274; 382/279
(58) Field of Search ................................ 358/447, 3.27; 382/274, 260, 275, 279, 309

(56) References Cited

U.S. PATENT DOCUMENTS

| | | | | |
|---|---|---|---|---|
| 4,850,029 A | * | 7/1989 | Moyer et al. ................ 382/272 |
| 4,982,294 A | * | 1/1991 | Morton et al. ............... 358/465 |
| 5,251,272 A | | 10/1993 | Hino et al. .................. 382/274 |
| 5,404,232 A | * | 4/1995 | Selby ........................... 358/406 |
| 5,790,281 A | | 8/1998 | Knox et al. .................. 358/504 |

* cited by examiner

Primary Examiner—Timothy M. Johnson
(74) Attorney, Agent, or Firm—Fay, Sharpe, Fagan, Minnich & McKee, LLP

(57) ABSTRACT

A method and apparatus are provided for determining a weighted average measured reflectance parameter $R_m$ for pixels in an image for use in integrated cavity effect correction of the image. For each pixel of interest $P_{i,j}$ in the image, an approximate spatial dependent average $A_{i,j}$, $B_{i,j}$ of video values in a region of W pixels by H scan lines surrounding the pixel of interest $P_{i,j}$ is computed by convolving video values $V_{i,j}$ of the image in the region with a uniform filter. For each pixel of interest $P_{i,j}$ a result of the convolving step is used as the reflectance parameter $R_m$. The apparatus includes a video buffer for storing the pixels of the original scanned image, and first and second stage average buffers for storing the computed approximate spatial dependent averages $A_{i,j}$, $B_{i,j}$. First and second stage processing circuits respectively generate the first and second stage average values $A_{i,j}$, $B_{i,j}$ by convolving the video values of the image in a preselected region with a uniform filter.

17 Claims, 3 Drawing Sheets

METHOD AND APPARATUS FOR IMPLEMENTING INTEGRATED CAVITY EFFECT CORRECTION IN SCANNERS

CROSS-REFERENCE TO RELATED APPLICATION

This application is related to U.S. application Ser. No. 09/010,331 filed on Jan. 21, 1998.

BACKGROUND OF THE INVENTION

The present invention is directed to the art of digital image processing and, more particularly, to a method and apparatus for implementing integrated cavity effect correction. The present invention is especially well suited for use in desk top scanners for correcting the integrated cavity effect caused by the dependence in a measured reflectance of a patch on the surrounding background and will be described with particular reference thereto. However, it is to be understood that the present invention has broader application and can be used in a wide range of digital image processing systems and other systems where there is a need for convolution filtering with a triangular, pyramidal, or other spatial responses.

The integrated cavity effect (ICE) phenomena in digital imaging scanners refers to the dependence in the measured reflectance of a patch on the surrounding background. This effect is caused by a local change in the illumination due to light reflecting from the neighboring locations on the document and back into an illuminator in the digital imaging scanner. It is well known that these context dependent reflectance variations often cause problems in the digital reproduction of documents. As an example, the image video in the background amid black characters is often much lower than the video signal value in a broad background area. This background variation causes additional dots to be printed around the characters when images are rendered using error diffusion techniques.

The ICE also adversely affects the performance of auto-window algorithms. Typically, auto-window algorithms depend on values of background information to identify window regions in the document. Therefore, non-uniform background values can easily cause the adverse merging of two or more windows separated only by a narrow white space.

U.S. Pat. No. 5,790,281 to Knox, et al. assigned to the assignee of the instant application describes a method of mathematically adjusting the measured reflectance of an image acquired by an image acquisition device for correcting the integrating cavity effect. As described there, typical image acquisition apparatus measure the amount of light reflected from the surface of the original document and send a corresponding set of electrical signals to a printing or storage module. Image acquisition usually requires illuminating the original document using a reflecting cavity which causes the measurement of the amount of light present on the surface of the document to become distorted. The method disclosed by the Knox, et al. '281 patent corrects this phenomenon by calculating the amount of light that reaches the surface of the original document by being reflected from the illumination system and the surrounding cavity. This allows the measured reflectance to be corrected, and the true reflectance to be used for subsequent output or storage.

In general, therefore, a rigorous mathematical method for correcting the integrated cavity effect is known. The correction formula is given by:

$$r(x) = \frac{R_m(x)(1 + fR_c)}{1 + f\langle R_m \rangle}$$

where r(x) is the corrected reflectance $R_m(x)$ is the measured reflectance, $R_c$ is the measured reflectance for a white paper, f is the fraction of light reflected off the document that is captured by the cavity and redirected onto the document, and the $\langle R_m \rangle$ refers to a convolution with a kernel g(x).

The convolution with a kernel g(x) is given by:

$$\langle R_m \rangle = \frac{\int g(x) R_m(x) dx}{\int g(x) d(x)}$$

As is apparent from the above, the reflectance correction clearly depends on the weighted average measure reflectance $\langle R_m \rangle$ of the surrounding area. This poses a significant processing problem in digital imaging systems when the selected context of the average is substantial. More particularly, when the selected context is large, the processing required in software for calculating the average is extremely slow. In addition, although it is possible to implement a real time hardware solution to the computation of the weighted average, the required circuitry is extremely expensive.

Accordingly, a method and apparatus for implementing an approximate weighted average for implementing integrated cavity effect correction in scanners is desired.

SUMMARY OF THE INVENTION

In accordance with one aspect of the invention, an inexpensive circuit and method is provided for computing the spatial dependent average in a digital image by repeatedly convolving the video data with a uniform filter. The uniform average is implemented by adding and subtracting data from the lead edge and trail edge of a selected "running block" context in both the slowscan and fastscan directions, respectively.

In accordance with a more limited aspect of the invention, a method of determining a weighted average measured reflectance parameter $R_m$ for pixels in an image for use in integrated cavity effect correction of the image is provided. The method includes the step of computing, for each pixel of interest $P_{i,j}$ in the image, and approximate spatial dependent average $A_{i,j}$, $B_{i,j}$ of video values in a region of W pixels by H scan lines surrounding the pixel of interest $P_{i,j}$ by twice convolving video values $V_{i,j}$ of the image in said region with a uniform filter and then using a result of the convolving step for each pixel of interest $P_{i,j}$ as the averaged reflectance parameter $\langle R_m \rangle$.

A primary advantage of the invention is a simple and low cost solution for generating a weighted average measured reflectance parameter $\langle R_m \rangle$ for use in integrated cavity effect correction in scanners.

It is another advantage of the invention that a close approximation to a rigorous calculated weighted average value in a large context is provided.

These and other advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments of the invention and are not to be construed as limiting same.

DETAILED DESCRIPTION OF THE PREFERRED EMBODIMENTS

Figure 1:
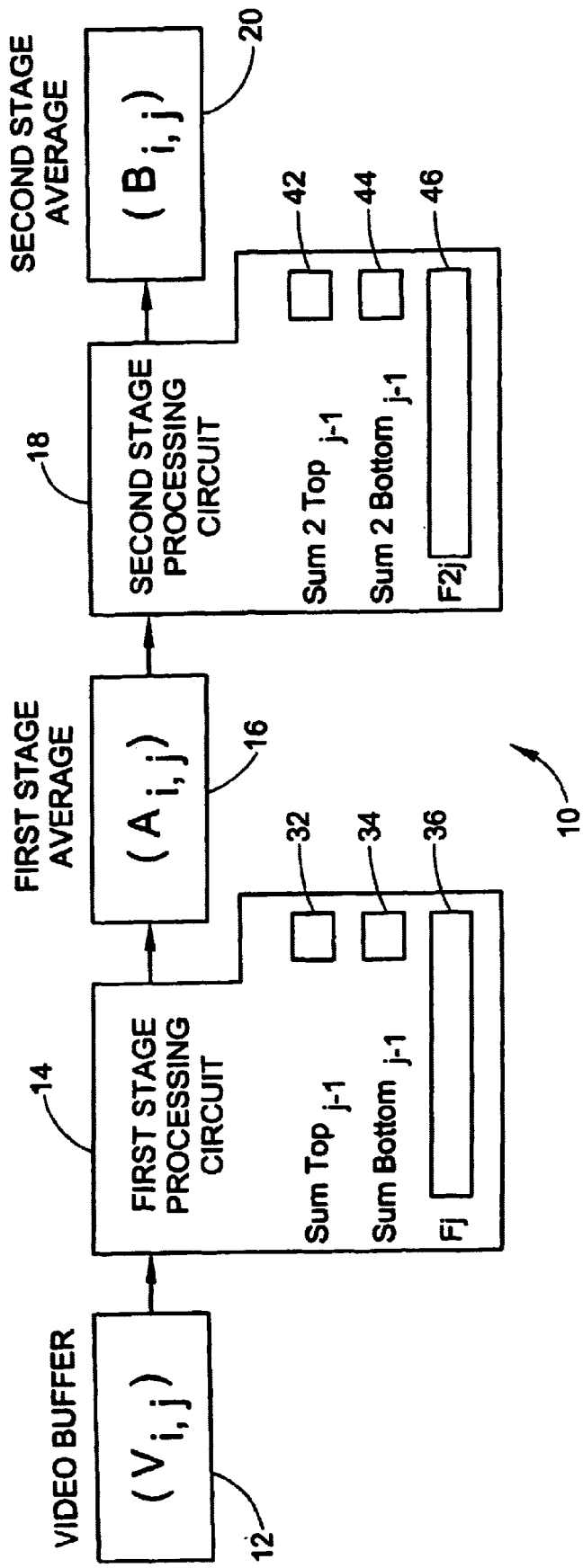
FIG. 1 is a schematic illustration of a system for implementing integrated cavity effect correction in accordance with the present invention.

With reference first to FIG. 1, a preferred processing system 10 for implementing integrated cavity effect correction in scanners will be described. As shown there, a video buffer 12 holds plurality of video values $V_{i,j}$ representative of the light intensity of a plurality of pixels $P_{i,j}$ obtained from imaging an original document using a digital scanner device or the like. A first stage processing circuit 14 is adapted to read each of the video values $V_{i,j}$ in blocks of selected size from each of the pixel locations $P_{i,j}$ in the video buffer 12 and generate first stage average values $A_{i,j}$ in accordance with the invention in a manner to be described in detail below. The first stage average values $A_{i,j}$ are stored in a first stage average buffer 16.

A second stage processing circuit 18 is adapted to read each of the first stage average values $A_{i,j}$ in blocks of selected size from the first stage average buffer 16 and generated a second stage average value $B_{i,j}$ in accordance with the invention. The second stage average values $B_{i,j}$ are stored in a second stage average buffer 20. Preferably, the block sizes read from the video buffer 12 and from the first stage average buffer 16 are the same size. However, other differently sized blocks can be used.

It is to be appreciated that the present invention exploits the mathematical principle that the double convolution of a 2-D uniform weight filter yields a filter with pyramidal weights. Additional or compounded convolutions of the 2-D uniform weight filter yields filters with weights that are more Gaussian in profile as the multiple convolutions are increased. Double convolution of a 2-D uniform weight filter over a 4×4 context yields a filter with a pyramidal shaped weighting profile as follows:

$$\begin{bmatrix} 1 & 2 & 3 & 4 & 3 & 2 & 1 \\ 2 & 4 & 6 & 8 & 6 & 4 & 2 \\ 3 & 6 & 9 & 12 & 9 & 6 & 3 \\ 4 & 8 & 12 & 16 & 12 & 8 & 4 \\ 3 & 6 & 9 & 12 & 9 & 6 & 3 \\ 2 & 4 & 6 & 8 & 6 & 4 & 2 \\ 1 & 2 & 3 & 4 & 3 & 2 & 1 \end{bmatrix}$$

By way of preliminary example of the preferred embodiment to be described below, let $V_{i,j}$ be the video at row i and column j in the video buffer 12 (FIG. 1):

$V_{11}$ $V_{12}$ $V_{13}$ $V_{14}$ $V_{15}$ $V_{16}$ $V_{17}$
$V_{21}$ $V_{22}$ $V_{23}$ $V_{24}$ $V_{25}$ $V_{26}$ $V_{27}$
$V_{31}$ $V_{32}$ $V_{33}$ $V_{34}$ $V_{35}$ $V_{36}$ $V_{37}$
$V_{41}$ $V_{42}$ $V_{43}$ $V_{44}$ $V_{45}$ $V_{46}$ $V_{47}$
$V_{51}$ $V_{52}$ $V_{53}$ $V_{54}$ $V_{55}$ $V_{56}$ $V_{57}$
$V_{61}$ $V_{62}$ $V_{63}$ $V_{64}$ $V_{65}$ $V_{66}$ $V_{67}$
$V_{71}$ $V_{72}$ $V_{73}$ $V_{74}$ $V_{75}$ $V_{76}$ $V_{77}$

Next, let $S_{i,j}$ be the sum of $V_{i,j}$ over a region or context of 4 by 4 to the left and above the location i,j as calculated by the first stage processing circuit 14, i.e. $S_{i,j}$ is the sum of $V_{mn}$ for i−4<m<=i and j−4<n<=j. According to the example, therefore:

$$S_{44}=V_{11}+V_{12}+V_{13}+V_{14}+V_{21}+V_{22}+V_{23}+V_{24}+V_{31}+V_{32}+V_{33}+V_{34}+V_{41}+V_{42}+V_{43}+V_{44}$$

$$S_{45}=V_{12}+V_{13}+V_{14}+V_{15}+V_{22}+V_{23}+V_{24}+V_{25}+V_{32}+V_{33}+V_{34}+V_{35}+V_{42}+V_{43}+V_{44}+V_{45}$$

etc.

The sum values $S_{i,j}$ of the video value $V_{i,j}$ are calculated as above by the first stage processing circuit 14 and put into a matrix form and stored in the first stage average buffer 16 as follows:

$S_{44}$ $S_{45}$ $S_{46}$ $S_{47}$
$S_{54}$ $S_{55}$ $S_{56}$ $S_{57}$
$S_{64}$ $S_{65}$ $S_{66}$ $S_{67}$
$S_{74}$ $S_{75}$ $S_{76}$ $S_{77}$

Summing the $S_{i,j}$ again over a region or context of 4×4 to the left and above by the second stage processing circuit 18 yields a set of second sum values $T_{i,j}$ for storage in the second stage average buffer 20. As an example:

$$T_{77}=S_{44}+S_{45}+S_{46}+S_{44}+_{54}+S_{55}+S_{56}+S_{57}+S_{64}+S_{65}+S_{66}+S_{67}+S_{74}+S_{75}+S_{76}+S_{77}$$

Expanding the $S_{i,j}$ explicitly in terms of $V_{i,j}$ shows that the double sum $T_{77}$ is a weighted sum of the video values $V_{i,j}$ stored in the video buffer 12 with a pyramidal shaped weights centered at pixel location i=4,j=4.

Accordingly:

$T_{77}=V_{11}+2V_{12}+3V_{13}+$ $4V_{14}+3V_{15}+2V_{16}+V_{17}+$ $2V_{21}+4V_{22}+6V_{23}+8V_{24}+$ $6V_{25}+4V_{26}+2V_{27}+3V_{31}+$ $6V_{32}+9V_{23}+12V_{34}+9V_{35}+$ $6V_{36}+3V_{37}+4V_{41}+8V_{42}+$ $12V_{43}+16V_{44}+12V_{45}+8V_{46}+$ $4V_{47}+3V_{51}+6V_{52}+9V_{53}+$ $12V_{54}+9V_{55}+6V_{56}+3V_{57}+$ $2V_{61}+4V_{62}+6V_{63}+8V_{61}+$ $6V_{65}+4V_{66}+2V_{67}+V_{71}+$ $2V_{72}+3V_{73}+4V_{74}+3V_{75}+$ $2V_{76}+V_{77}$

The above illustrates that the sum of a sum of a 4×4 context yields a pyramidal weighted sum of a 7×7 context. In general, a sum of sums of a W by H context yields a pyramidal weighted sum over a context of 2W-1 by 2H-1.

Figure 2:
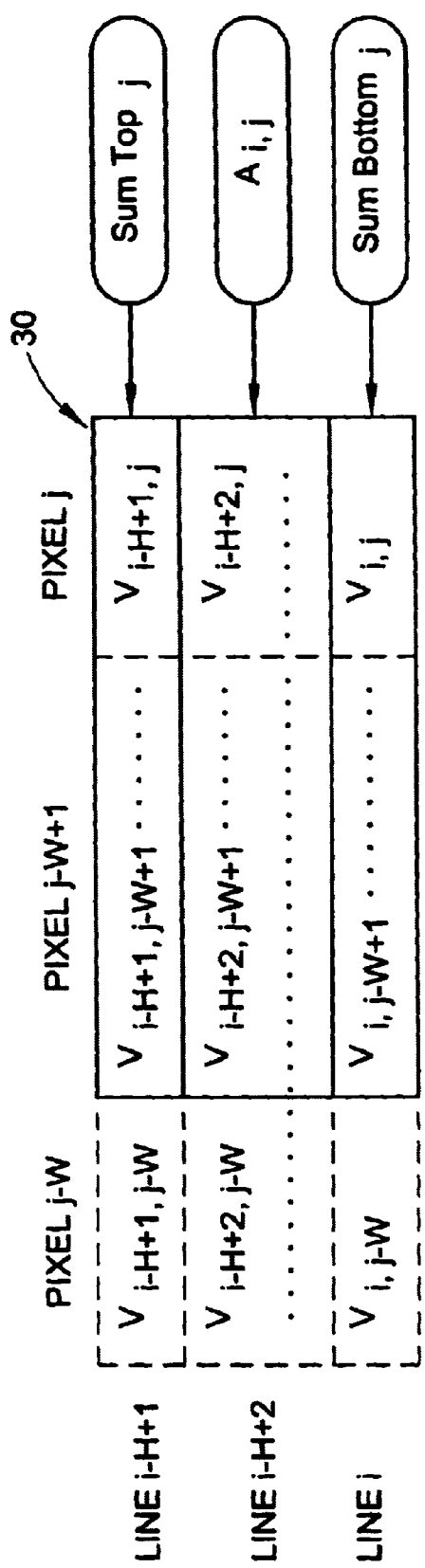
FIG. 2 is graphical representation illustrating a first step portion of the processing performed in the system shown in FIG. 1.

With continued reference to FIG. 1 and with additional reference now to FIG. 2, the preferred particular computation of the pyramidal weighted sum in the two-dimensional case with reduced number of multipliers and adders in accordance with the present invention will be described. Preferably, in order to reduce the overall number of bits used, the first stage processing circuit 14 of the subject invention computes the average $A_{i,j}$ of the video values $V_{i,j}$ rather than the sum $S_{i,j}$ as described above. Likewise, in the second stage processing circuit 18, the second stage average values $B_{i,j}$ of the first stage average values $A_{i,j}$ are computed rather than the strict sum $T_{i,j}$ as described above. It is to be appreciated, however, that the subject invention embraces both the strict sum calculation to provide the pyramidal weighted sums as described above as well as the average value calculations as described below to compute the pyramidal weighted average for the purposes of reducing the numbers of bits used as well as for reducing the number of multipliers and adders needed.

Preferably, in accordance with the invention, the video values $V_{i,j}$ in a window size of W pixels by H scan lines are used by the first stage processing circuit 14 to compute the first stage average values $A_{i,j}$ for storage in the first stage average buffer 16. Preferably, as shown in FIG. 2, a running block 30 of the video values $V_{i,j}$ is processed by the first stage processing circuit 14 to generate the first stage average values $A_{i,j}$. The running block 30 essentially frames pixels of the video buffer 12 to provide a context having a width of W pixels and a height of H scan lines. It is to be appreciated that the video values $V_{i,j}$ are retrieved from the video buffer 12 by the first stage processing circuit 14 in a manner so that the running block 30 "progresses" in the pixel direction along the scan lines or, equivalently, to the right as viewed in FIG. 2 by a single pixel column at a time. After the running block is "moved" to the rightmost edge of the video values stored in the video buffer 12, the block is shifted downwardly by one scanline and to the extreme left. The running block essentially moves in a raster-like fashion repeatedly to retrieve video values from the next set of scan lines in the video buffer.

The first stage processing circuit 14 includes a first register 32 for storing a value $SumTop_{j-1}$ representative of the row sum of the video values at scan line $SL_{i-H+1}$ from pixel $P_{j-W}$ to pixel $P_{j-1}$. A second register 34 stores the row sum of the video values at scan line $SL_i$ from pixel $P_{j-W}$ to pixel $P_{j-1}$. As the image processing performed by the first stage processing circuit 14 proceeds from pixel $P_{j-1}$ to pixel $P_j$, the processing circuit 14 updates the first and second registers 32, 34 according to the following:

$$SumTop_j = SumTop_{j-1} + V_{i-H+1,j} - V_{i-H+1,j-W}$$

$$SumBottom_j = SumBottom_{j-1} + V_{i,j} - V_{i,j-W}$$

A first-in-first-out (FIFO) buffer 36 is included in the first stage processing circuit 14 to store, at each pixel location, a value $F_j$ which is representative of the sum of the row averages from pixel $P_{j-W+1}$ to pixel $P_j$ over scan lines $SL_{i-H+1}$ to scan line $SL_{i-1}$. Preferably, in accordance with the present invention, the value $F_j$ is computed in the previous scan line cycle and is thus immediately available from the first FIFO 36. For each pixel location in the video buffer 12, the first stage processing circuit 14 calculates a first stage average value $A_{i,j}$ according to the following:

$$A_{i,j} = (F_j + SumBottom_j/W)/H.$$

Next, the first stage processing circuit 14 updates the value $F_j$ in the first FIFO 36 for use in the next scan line cycle according to the following:

$$F_j = F_j + (SumBottom_j - SumTop_j)/W.$$

Figure 3:
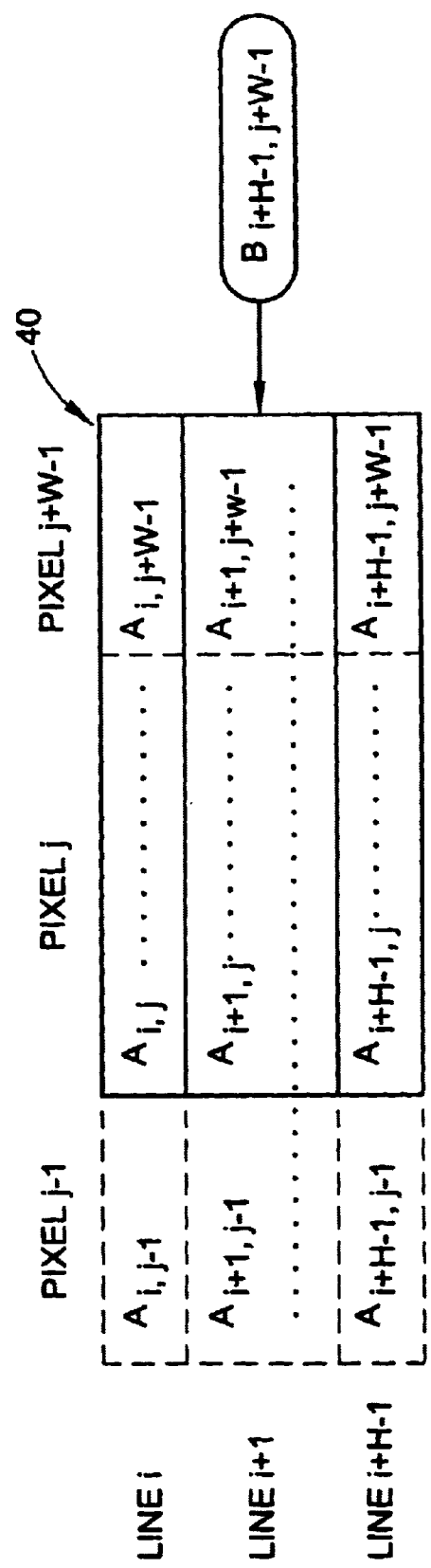
FIG. 3 is a graphical representation illustrating a second step portion of the processing performed in the system shown in FIG. 1; and, FIG. 4 is a flowchart illustrating a preferred method performed by the system shown in FIG. 1 for implementing integrated cavity effect correction in accordance with the present invention.

With continued reference to FIG. 1 and with additional reference now to FIG. 3, the second step portion of the processing for computation of the pyramidal weighted average for implementing the integrated cavity effect correction in accordance with the present invention will be described. As discussed above, preferably, in order to reduce the overall number of bits used, the second stage processing circuit 18 of the subject invention computes second stage average values $B_{i,j}$ of the first stage average values $A_{i,j}$ rather than the strict sum calculation $T_{i,j}$ described above. Again, it is to be appreciated that the subject invention embraces both the strict sum calculation to provide the pyramidal weighted average as well as the average value calculations as described herein to compute the pyramidal weighted sums for the purposes of reducing the numbers of bits used as well as for reducing the number of multipliers and adders needed.

Preferably, in accordance with the invention, the first stage average values $A_{i,j}$ in a window size of W pixels by H scan lines are used by the second stage processing circuit 18 to compute the second stage average values $B_{i,j}$ for storage in the second stage average output 20. Preferably, as shown in FIG. 3, a running block 40 of the first stage average values $A_{i,j}$ is processed by the second stage processing circuit 18 to generate the second stage average values $B_{i,j}$. The running block 40 essentially frames pixel locations of the first stage average buffer 16 to provide a context having a width of W pixels and a height of H scan lines. It is to be appreciated that the first stage average values $A_{i,j}$ are retrieved from the buffer 16 by the second stage processing circuit 18 in a manner so that the running block 40 "progresses" in the pixel direction along the scan lines or to the right as viewed in FIG. 3 by a single pixel column at a time. After the running block is "moved" to the rightmost edge of the first stage average values $A_{i,j}$ stored in the first stage average buffer 16, the block is shifted downwardly and to the extreme left. The running block essentially moves in a raster-like fashion repeatedly to retrieve video values from the next set of scan lines in the first stage average buffer 16.

The second stage processing circuit 18 includes a first register 42 for storing a value $Sum2Top_{j-1}$ representative of the row sum of first stage average values at scan line $SL_i$ from pixel location $P_{j-1}$ to pixel location $P_{j+W-2}$. A second register 44 stores the row sum of the first stage average values at scan line $SL_{i+H-1}$ from pixel location $P_{j-1}$ to pixel location $P_{j+W-2}$. As the image processing performed by the second stage processing circuit 18 proceeds from pixel location $P_{j-1}$ to pixel location $P_j$, the processing circuit 18 updates the first and second registers 42, 44 according to the following:

$$Sum2Top_j = Sum2Top_{j-1} + A_{i,j+W-1} - A_{i,j-1}$$

$$Sum2Bottom_j = Sum2Bottom_{j-1} + A_{i+H-1,j+W-1} - A_{i+H-1,j-1}$$

A first-in-first-out (FIFO) buffer 46 is included in the second stage processing circuit 18 to store, at each pixel location, a value $F2_j$ which is representative of the sum of the row averages from pixel location $P_j$ to pixel location $P_{j+W-1}$ over scan lines $SL_i$ to scan line $SL_{i+H-2}$. Preferably, in accordance with the present invention, the value $F2_j$ is computed in the previous scan line cycle and is thus immediately available from the second FIFO 46. For each pixel location in the second stage average buffer 16, the second stage processing circuit 18 calculates a second stage average value $B_{i,j}$ according to the following:

$$B_{i+H-1,j+W-1} = (F2_j + Sum2Bottom_j/W)/H.$$

Next, the second stage processing circuit 18 updates the value $F2_j$ in the second FIFO 46 for use in the next scan line cycle according to the following:

$$F2_j = F2_j + (\text{Sum2Bottom}_j - \text{Sum2Top}_j)/W$$

Figure 4:
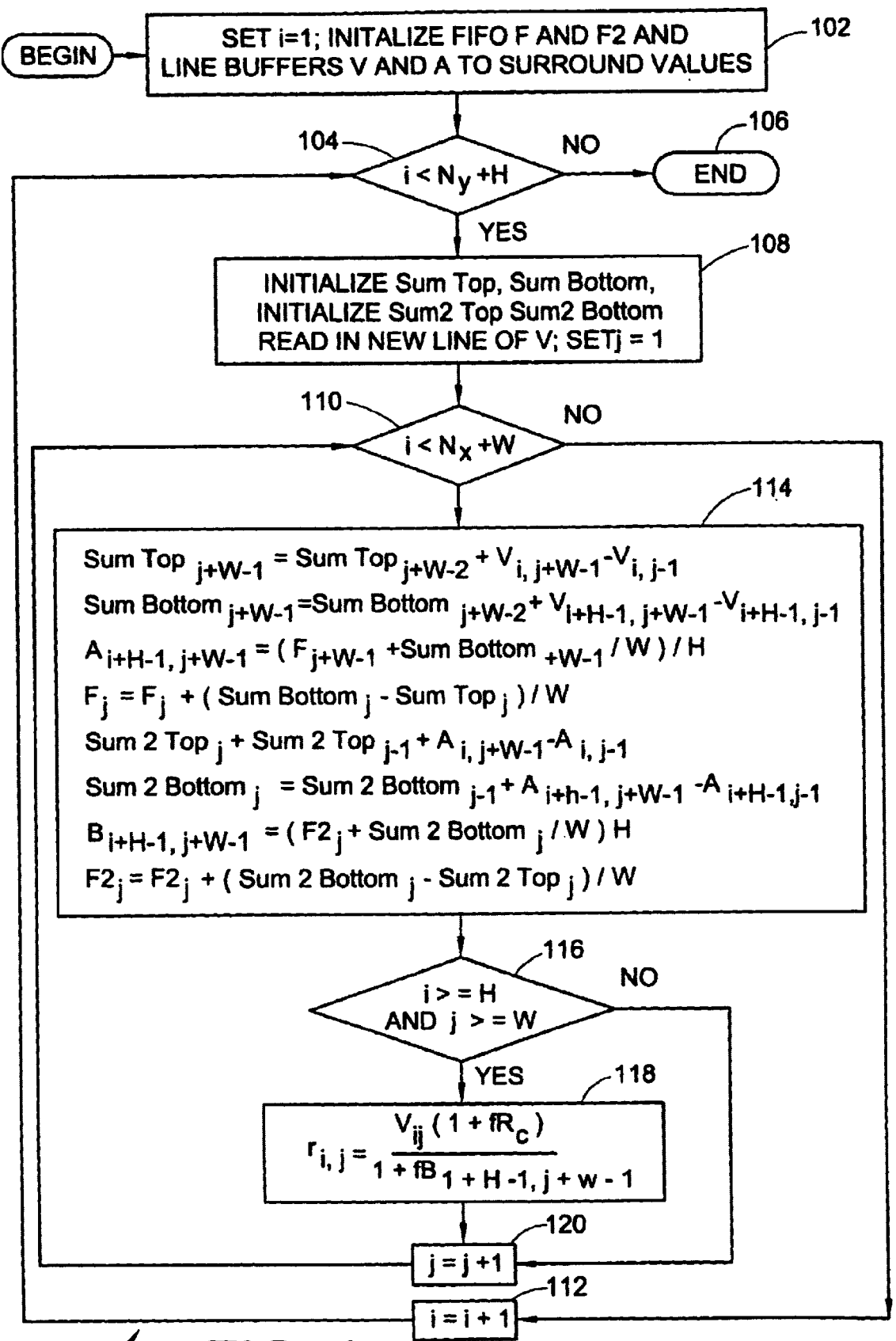

With reference next to FIG. 4, the preferred method 100 for implementing integrated cavity effect correction in accordance with the present invention is shown. With reference now to that figure, a first step 102 initializes the first and second FIFO buffers 32, 46 respectively. In addition, the first step 102 initializes a scan line counter i to an initial value of "1" as well as a set of line buffers V and A to values corresponding to the video values along the extreme edge of the scanned digital image.

Next, in step 104, the scan line counter value is compared against the sum of a first value $N_y$ representative of the total number of scan lines in the image plus a value H representative of the height in scan lines of the preselected running buffer size. Of course, when the current scan line i exceeds the total number of scan lines in the image plus the height of the running buffer, the method 100 ends at step 106. However, when the current scan line i is yet within the scanned image bounds, an initialization procedure is executed at step 108. More particularly, in step 108, the first and second registers 32, 34 in the first stage processing circuit 14 are initialized as well as the first and second registers 42, 44 in the second stage processing circuit 18. Further in step 108, a new scan line of the video buffer 12 is read into the first stage processing circuit 14 and a parameter j is initialized to a value "1" to designate the first pixel column.

Next, at step 110, the current pixel column j is compared against a parameter $N_x$ representative of the total number of pixels in an image across the width of the image plus a parameter W representative of the width of the running block 30. When the current pixel column j exceeds the sum of the width of the image $N_x$ plus the width W of the running buffer 30, the parameter i representative of the current scan line is incremented at step 112. On the other hand, when the current pixel column j is less than the sum of the width of the image $N_x$ and the width of the running buffer 30, the processing in block 114 is executed.

Next, in step 116, the parameter i representative of the current scan line is compared against the height H of the running buffer 30. In addition, the parameter j representative of the current pixel column is compared against a parameter W representative of the width of the running buffer 30. When both the current scan line and the current pixel column are at or exceed the height and width H, W respectively of the running buffer, the integrated cavity effect corrected video $r_{i,j}$ at pixel location $P_{i,j}$ is computed in step 118 in accordance with the following equation:

$$r_{i,j} = \frac{V_{ij}(1 + fR_C)}{1 + fB_{1+H-1, j+W-1}}$$

In step 120, the parameter j representative of the current pixel column is incremented at step 120. This has the effect of "sliding" each of the running block 30, 40 to the right as viewed in FIGS. 2 and 3. Thereafter, the method 100 continues at step 110 in a manner described above.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method of determining a weighted average measured reflectance parameter $<R_m>$ for pixels in an image for use in integrated cavity effect correction of the image, the method comprising the steps of:

for each pixel of interest $P_{i,j}$ in said image, computing an approximate spatial dependent average $A_{i,j}$, $B_{i,j}$ of video values in a region of W pixels by H scan lines surrounding the pixel of interest $P_{i,j}$ by iteratively convolving video values $V_{i,j}$ of the image in said region with a uniform filter; and, for each pixel of interest $P_{i,j}$, using a result of the convolving steps as said average reflectance parameter $<R_m>$.

2. The method according to claim 1 wherein the step of computing the approximate spatial dependent average includes:

for said each pixel of interest $P_{i,j}$, calculating, as a first result $A_{i,j}$, a sum of video values $V_{i,j}$ within the region of W pixels by H scan lines;

for said each pixel of interest $P_{i,j}$, calculating, as a second result $B_{i,j}$, a sum of said first results $A_{i,j}$ within said region of W pixels by H scan lines; and, using said second result $B_{i,j}$ as said average reflectance parameter $<R_m>$.

3. The method according to claim 2 wherein the step of convolving the video values of the image in said region with said uniform filter includes:

at each pixel of interest $P_{i,j}$ computing a first average video value $A_{i,j}$ based on a sum of video values $V_{i,j}$ within said region of W pixels by H scan lines surrounding said each pixel of interest $P_{i,j}$; and, at each pixel of interest $P_{i,j}$, computing a second average video value $B_{i,j}$ based on a sum of said first average video values $A_{i,j}$ within said region of said W pixels by H scan lines surrounding said each pixel of interest.

4. The method according to claim 3 wherein:

the step of computing the said first average video value $A_{i,j}$ includes computing said first average video value $A_{i,j}$ based on sum of video values $V_{i,j}$ within a first context from a first video value $V_{i-H+1, j-W+1}$ at a first pixel $P_{i-H+1, j-W+1}$ to a second pixel $P_{i-H+1, j}$ in a first scan line $SL_{i-H+1}$ and from a third pixel $P_{i, j-W+1}$ to a fourth pixel $P_{i,j}$ and a second scan line $SL_i$; and, the step of computing said second average video value $B_{i,j}$ includes computing said second average video value $B_{i,j}$ based on sum of said first average video values $A_{i,j}$ within a second context from a first average video value $A_{i,j}$ at a first pixel $P_{i,j}$ to a second average video value $A_{i,j+W-1}$ at a second pixel $P_{i,j+W-1}$ and from a third average video value $A_{i+H-1, j}$ at a third pixel $P_{i+H-1, j}$ to a fourth average video value $A_{i+H-1, j+W-1}$ at a fourth pixel $P_{i+H-1, j+W-1}$.

5. The method according to claim 4 wherein the step of computing said first average video value $A_{i,j}$ includes:

calculating a first scan line sum within said first context as:

$$\text{SumTop}_j = \text{SumTop}_{j-1} + V_{i-H+1, j} - V_{i-H+1, j-W};$$

calculating a second scan line sum within said first context as:

$$\text{SumBottom}_j = \text{SumBottom}_{j-1} + V_{i,j} - V_{i, j-W};$$

providing a sum of scan line row averages $F_j$ within said context from said first scan line $SL_{i-H+1}$ to a third scan line $SL_{i-1}$; and,
computing said first average video value $A_{i,j}$ as:

$$A_{ij}=(F_j+\text{SumBottom}_j/W)/H.$$

6. The method according to claim 4 wherein the step of computing said second average video value $B_{i,j}$ includes:
calculating a third scan line sum within said second context as:

$$\text{Sum2Top}_j=\text{Sum2Top}_{j-1}+A_{i,j+W-1}-A_{i,j-1};$$

calculating a fourth scan line sum within said second context as:

$$\text{Sum2Bottom}_j=\text{Sum2Bottom}_{j-1}+A_{j+H-1,j+W-1}-A_{j+H-1,j-1};$$

providing a second sum of scan line row averages $F2_j$ within said second context from said second scan line $SL_i$ to a third scan line $S_{Li+H-1}$; and,
computing said second average video value $B_{i,j}$ as:

$$B_{i+H-1,j+W-1}=(F2_j+\text{Sum2Bottom}_j/W)/H.$$

7. A method of determining a weighted average measured reflectance parameter $<R_m>$ for pixels in an image for use in integrated cavity effect correction of the image, the method comprising the steps of:
for each pixel of interest $P_{i,j}$ in said image, computing a spatially dependent sum $S_{i,j}$, $T_{i,j}$ of video values in a region of W pixels by H scan lines surrounding the pixel of interest $P_{i,j}$ by iteratively convolving video values $V_{i,j}$ of the image in said region with a uniform filter; and,
for each pixel of interest $P_{i,j}$, using a result of the convolving steps as said average reflectance parameter $<R_m>$.

8. The method according to claim 7 wherein the step of convolving the video values of the image in said region with said uniform filter includes:
at each pixel of interest $P_{i,j}$ computing a first video sum value $S_{i,j}$ based on a sum of video values $V_{i,j}$ within said region of W pixels by H scan lines surrounding said each pixel of interest $P_{i,j}$; and,
at each pixel of interest $P_{i,j}$, computing a second video sum value $T_{i,j}$ based on a sum of said first video sum values $S_{i,j}$ within said region of said W pixels by H scan lines surrounding said each pixel of interest.

9. The method according to claim 8 wherein:
the step of computing the said first video sum value $S_{i,j}$ includes computing said first video sum value $S_{i,j}$ based on a sum of video values $V_{i,j}$ within a first context from a first video value $V_{i-H+1,j-W+1}$ at a first pixel $P_{i-H+1,j-W+1}$ to a second pixel $P_{i-H+1,j}$ in a first scan line $SL_{i-H+1}$ and from a third pixel $P_{i,j-W+1}$ to a fourth pixel $P_{i,j}$ and a second scan line $SL_i$; and,
the step of computing said second video sum value $T_{i,j}$ includes computing said second video sum value $T_{i,j}$ based on a sum of said first video sum values $S_{i,j}$ within a second context from a first video sum value $S_{i,j}$ at a first pixel $P_{i,j}$ to a second video sum value $S_{i,j+W-1}$ at a second pixel $P_{i,j+W-1}$ and from a third video sum value $S_{i+H-1,j}$ at a third pixel $P_{i+H-1,j}$ to a fourth video sum value $S_{i+H-1,j+W-1}$ at a fourth pixel $P_{i+H-1,j+W-1}$.

10. The method according to claim 9 wherein the step of computing said first video sum value $S_{i,j}$ includes:
calculating a first scan line sum within said first context as:

$$\text{SumTop}_j=\text{SumTop}_{j-1}+V_{i-H+1,j}-V_{i-H+1,j-W};$$

calculating a second scan line sum within said first context as:

$$\text{SumBottom}_j=\text{SumBottom}_{j-1}+V_{i,j}-V_{i,j-W};$$

providing a sum of scan line row sums $F_j$ within said context from said first scan line $SL_{i-H+1}$ to a third scan line $SL_{i-1}$; and,
computing said first video sum value $S_{i,j}$ as:

$$S_{ij}(F_j+\text{SumBottom}_j).$$

11. The method according to claim 9 wherein the step of computing said second video sum value $T_{i,j}$ includes:
calculating a third scan line sum within said second context as:

$$\text{Sum2Top}_j=\text{Sum2Top}_{j-1}+A_{i,j+W-1}-A_{i,j-1};$$

calculating a fourth scan line sum within said second context as:

$$\text{Sum2Bottom}_j=\text{Sum2Bottom}_{j-1}+A_{j+H-1,j+W-1}-A_{j+H-1,j-1};$$

providing a second sum of scan line row sums $F2_j$ within said second context from said second scan line $SL_i$ to a third scan line $S_{Li+H-1}$; and,
computing said second video sum value $T_{i,j}$ as:

$$T_{i+H-1,+W-1}=(F2_j+\text{Sum2Bottom}_j).$$

12. A system for determining a weighted average measured reflectance parameter $<R_m>$ for pixels in an image for use in integrated cavity effect correction of the image, the system comprising:
a set of processing circuits computing, for each pixel of interest $P_{i,j}$ in said image, an approximate spatial dependent average $A_{i,j}$, $B_{i,j}$ of video values in a region of W pixels by H scan lines surrounding the pixel of interest $P_{i,j}$ by iteratively convolving video values $V_{i,j}$ of the image in said region with a uniform filter and, for each pixel of interest $P_{i,j}$, using a result of the convolving steps as said average reflectance parameter $<R_m>$.

13. The system according to claim 12 wherein the set of processing circuits include:
a first stage processing circuit for calculating, for said each pixel of interest $P_{i,j}$, a sum of video values $V_{i,j}$ within the region of W pixels by H scan lines as a first result $A_{i,j}$;
a second stage processing circuit for calculating, for said each pixel of interest $P_{i,j}$, a sum of said first results $A_{i,j}$ within said region of W pixels by H scan lines as a second result $B_{i,j}$.

14. The system according to claim 13 wherein:
the first stage processing circuit is adapted to compute at each pixel of interest $P_{i,j}$, a first average video value $A_{i,j}$ based on sum of video values $V_{i,j}$ within said region of W pixels by H scan lines surrounding said each pixel of interest $P_{i,j}$; and,
the second stage processing circuit is adapted to compute at each pixel of interest $P_{i,j}$, a second average video value $B_{i,j}$ based on a sum of said first average video values $A_{i,j}$ within said region of said W pixels by H scan lines surrounding said each pixel of interest.

15. The system according to claim 14 wherein:

the first stage processing circuit is adapted to compute said first average video value $A_{i,j}$ based on sum of video values $V_{i,j}$ within a first context from a first video value $V_{i-H+1,j-W+1}$ at a first pixel $P_{i-H+1,j-W+1}$ to a second pixel $P_{i-H+1,j}$ in a first scan line $SL_{i-H+1}$ and from a third pixel $P_{i,j-W+1}$ to a fourth pixel $P_{i,j}$ and a second scan line $SL_i$; and, the second stage processing circuit is adapted to compute said second average video value $B_{i,j}$ based on sum of said first average video values $A_{i,j}$ within a second context from a first average video value $A_{i,j}$ at a first pixel $P_{i,j}$ to a second average video value $A_{i,j+W-1}$ at a second pixel $P_{i,j+W-1}$ and from a third average video value $A_{i+H-1,j}$ at a third pixel $P_{i+H-1,j}$ to a fourth average video value $A_{i+H-1,j+W-1}$ at a fourth pixel $P_{i+H-1,j+W-1}$.

16. The system according to claim 15 wherein the first stage processing circuit includes:

means for calculating a first scan line sum within said first context as:

$$\text{SumTop}_j = \text{SumTop}_{j-1} + V_{i-H+1,j} - V_{i-H+1,j-W};$$

means for calculating a second scan line sum within said first context as:

$$\text{SumBottom}_j = \text{SumBottom}_{j-1} + V_{i,j} - V_{i,j-W};$$

means for providing a sum of scan line row averages $F_j$ within said context from said first scan line $SL_{i-H+1}$ to a third scan line $SL_{i-1}$; and, means for computing said first average video value $A_{i,j}$ as:

$$A_{ij} = (F_j + \text{SumBottom}_j/W)/H.$$

17. The method according to claim 15 wherein the second stage processing circuit includes:

means for calculating a third scan line sum within said second context as:

$$\text{Sum2Top}_j = \text{Sum2Top}_{j-1} + A_{i,j+W-1} - A_{i,j-1};$$

means for calculating a fourth scan line sum within said second context as:

$$\text{Sum2Bottom}_j = \text{Sum2Bottom}_{j-1} + A_{j+H-1,j+W-1} - A_{j+H-1,j-1};$$

means for providing a second sum of scan line row averages $F2_j$ within said second context from said second scan line $SL_i$ to a third scan line $S_{Li+H-1}$; and, computing said second average video value $B_{i,j}$ as $$B_{i+H-1,+W-1} = (F2_j + \text{Sum2Bottom}_j/W)/H.$$

* * * * *